US011990088B2

(12) United States Patent
Hao

(10) Patent No.: US 11,990,088 B2
(45) Date of Patent: May 21, 2024

(54) DISPLAY DRIVING DEVICE AND ELECTRONIC APPARATUS

(71) Applicant: Chipone Technology (Beijing) Co., Ltd., Beijing (CN)

(72) Inventor: Rongjie Hao, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/301,319

(22) Filed: Apr. 17, 2023

(65) Prior Publication Data

US 2023/0267879 A1 Aug. 24, 2023

Related U.S. Application Data

(63) Continuation of application No. PCT/CN2021/091059, filed on Apr. 29, 2021.

(30) Foreign Application Priority Data

Oct. 20, 2020 (CN) ......................... 202011127205.8

(51) Int. Cl.
*G09G 3/3225* (2016.01)
*G09G 3/32* (2016.01)

(52) U.S. Cl.
CPC ............. *G09G 3/3225* (2013.01); *G09G 3/32* (2013.01); *G09G 2320/0233* (2013.01); *G09G 2330/021* (2013.01)

(58) Field of Classification Search
CPC ................... G09G 3/3225; G09G 3/32; G09G 2320/0233; G09G 2330/021; G09G 2330/028; G09G 3/3208
See application file for complete search history.

(56) References Cited

U.S. PATENT DOCUMENTS

| | | | | |
|---|---|---|---|---|
| 10,643,529 | B1 * | 5/2020 | Chien .................. | G09G 3/3225 |
| 2011/0018787 | A1 | 1/2011 | Nakamura et al. | |
| 2012/0280970 | A1 * | 11/2012 | Kato ................... | G09G 3/3291 345/212 |

FOREIGN PATENT DOCUMENTS

| | | | |
|---|---|---|---|
| CN | 1987711 | A | 6/2007 |
| CN | 101312022 | A | 11/2008 |
| CN | 103137072 | A | 6/2013 |

(Continued)

OTHER PUBLICATIONS

International Search Report dated Aug. 2, 2021, in PCT/CN2021/091059, 3 pgs.

*Primary Examiner* — Koosha Sharifi-Tafreshi
(74) *Attorney, Agent, or Firm* — Henry Patent Law Firm PLLC

(57) ABSTRACT

The present disclosure relates to a display driving device and an electronic apparatus, wherein the device comprises a power supply module for outputting a first power supply voltage and a second power supply voltage; and a display panel including a power interface electrically connected to the power supply module. The power supply module is further configured to output a first regulated voltage and/or a second regulated voltage for a target display region from which a distance to the power interface is greater than a preset distance, to regulate a first terminal voltage of a light-emitting transistor in the target display region via the first regulated voltage and/or regulate a second terminal voltage via the second regulated voltage.

14 Claims, 3 Drawing Sheets

(56) References Cited

FOREIGN PATENT DOCUMENTS

| | | | |
|---|---|---|---|
| CN | 104809988 | A | 7/2015 |
| CN | 105468063 | | 4/2016 |
| CN | 105761679 | | 7/2016 |
| CN | 105825816 | A | 8/2016 |
| CN | 106128359 | A | 11/2016 |
| CN | 205680029 | U | 11/2016 |
| CN | 106816137 | A | 6/2017 |
| CN | 107994056 | A | 5/2018 |
| CN | 108269527 | A | 7/2018 |
| CN | 110021267 | | 7/2019 |
| CN | 110444164 | | 11/2019 |
| CN | 111341270 | | 6/2020 |
| CN | 111383603 | A | 7/2020 |
| CN | 112164368 | | 1/2021 |
| KR | 20190023859 | | 3/2019 |
| WO | 2020118833 | A1 | 6/2020 |
| WO | 2022083099 | | 4/2022 |

* cited by examiner

DISPLAY DRIVING DEVICE AND ELECTRONIC APPARATUS

CROSS-REFERENCE TO RELATED APPLICATIONS

The present disclosure is a continuation of and claims priority under 35 U.S.C. 120 to PCT Application No. PCT/CN2021/091059, filed on Apr. 29, 2021, which claims priority to Chinese Patent Application No. 202011127205.8, filed with National Intellectual Property Administration, PRC, on Oct. 20, 2020, entitled "DISPLAY DRIVE APPARATUS AND ELECTRONIC DEVICE". All the above referenced priority documents are incorporated herein by reference in their entireties.

TECHNICAL FIELD

The present disclosure relates to the technical field of display, in particular to a display driving device and an electronic apparatus.

BACKGROUND

With the continuous development of science and technology, an increasing number of electronic apparatuses with a display function are widely used in people's daily life and work, bringing great convenience to people's daily life and work, and have become an indispensable tool for people nowadays. A display panel is an important part of an electronic apparatus to execute the display function. However, for an existing display panel, due to different driving capabilities for different regions of the display panel, the brightness of different regions of the display panel is not uniform. With the increasing size of the display panel, the brightness difference between the different regions of the display panel is greater, and consequently the display effect is worse.

SUMMARY

In view of the foregoing, the present disclosure provides a display driving device, comprising:

a power supply module configured to output a first power supply voltage and a second power supply voltage;

a display panel comprising a power interface electrically connected to the power supply module, the power interface being configured to input the first power supply voltage and the second power supply voltage, the display panel comprising a plurality of light-emitting transistors, a first terminal of each of the plurality of light-emitting transistors being used for receiving the first power supply voltage and a second terminal of each of the plurality of light-emitting transistors being used for receiving the second power supply voltage, the display panel being divided into a plurality of display regions based on distances between the light-emitting transistors and the power interface, each display region comprising one or more light-emitting transistors, the power supply module being further configured to output a first regulated voltage and/or a second regulated voltage for a target display region from which a distance to the power interface is greater than a preset distance, to regulate a first terminal voltage of the light-emitting transistor in the target display region via the first regulated voltage and/or regulate a second terminal voltage via the second regulated voltage.

In a possible implementation, the power supply module comprises:

a first voltage conversion unit configured to acquire the first power supply voltage and the second power supply voltage based on an input voltage.

In a possible implementation, the power supply module further comprises:

a voltage regulation unit configured to output the first regulated voltage based on a first reference voltage, and/or output the second regulated voltage based on a second reference voltage.

In a possible implementation, the voltage regulation unit comprises a first operational amplifier, a first resistor, and a second resistor, wherein:

a positive input terminal of the first operational amplifier is configured to input the first reference voltage, a negative input terminal of the first operational amplifier is electrically connected to a second end of the first resistor, and an output terminal of the first operational amplifier is electrically connected to the second end of the first resistor and a first end of the second resistor; and a second end of the second resistor is configured to output the first regulated voltage.

In a possible implementation, the voltage regulation unit further comprises a second operational amplifier, a third resistor, a fourth resistor, a fifth resistor, and a sixth resistor, wherein:

a first end of the fifth resistor is configured to input the second reference voltage, and a second end of the fifth resistor is electrically connected to a negative input terminal of the second operational amplifier and a first end of the third resistor;

a second end of the third resistor is electrically connected to an output terminal of the second operational amplifier and a first end of the fourth resistor;

a positive input terminal of the second operational amplifier is electrically connected to a first end of the sixth resistor, and a second end of the sixth resistor is grounded; and a second end of the fourth resistor is configured to output the second regulated voltage.

In a possible implementation, the first voltage conversion unit is further configured to output the first reference voltage and/or the second reference voltage.

In a possible implementation, the power supply module further comprises:

a second voltage conversion unit configured to acquire the first reference voltage and/or the second reference voltage based on an input voltage.

In a possible implementation, the power supply module comprises:

at least one third voltage conversion unit, the number of which corresponds to the number of the target display regions, each third voltage conversion unit corresponding to each target display region, wherein:

each third voltage conversion unit is configured to acquire a first terminal voltage of a corresponding target display region, and generate the first regulated voltage by using the first terminal voltage; and/or each third voltage conversion unit is further configured to acquire a second terminal voltage of a corresponding target display region, and generate the second regulated voltage by using the second terminal voltage.

In a possible implementation, the power supply module further comprises:

at least one fourth voltage conversion unit, the number of which corresponds to the number of the target display regions;

the first voltage conversion unit being further configured to control each fourth voltage conversion unit to output the first regulated voltage and/or the second regulated voltage, wherein the first voltage conversion unit and at least one fourth voltage conversion unit are configured to operate in a master-slave working mode, and the first voltage conversion unit and the at least one fourth voltage conversion unit are electrically connected through a control bus.

In a possible implementation, the first voltage conversion unit is further configured to acquire a first terminal voltage of each target display region, and use the first terminal voltage to control a corresponding fourth voltage conversion unit to output the first regulated voltage; and/or the first voltage conversion unit is further configured to acquire a second terminal voltage of each target display region, and use the second terminal voltage to control a corresponding fourth voltage conversion unit to output the second regulated voltage.

In a possible implementation, the first power supply voltage is a positive voltage, and the second power supply voltage is a negative voltage.

In a possible implementation, the display panel comprises any one or more of a light-emitting diode (LED), a mini light-emitting diode (MiniLED), a micro light-emitting diode (Micro LED), and an organic light-emitting diode (OLED).

According to another aspect of the present disclosure, there is provided an electronic apparatus, comprising the display driving device.

In a possible implementation, the electronic apparatus comprises a display, a smart phone, or a portable device.

With the above device, in the embodiments of the present disclosure, a first regulated voltage and/or a second regulated voltage are/is output for a target display region from which a distance to a power interface is greater than a preset distance, to regulate a first terminal voltage of a light-emitting transistor in the target display region via the first regulated voltage and/or regulate a second terminal voltage via the second regulated voltage, which enables uniform display brightness of the respective regions of a display panel and thus improves the display effect.

Other features and aspects of the present disclosure will become apparent from the following detailed description of exemplary embodiments with reference to the drawings.

BRIEF DESCRIPTION OF THE DRAWINGS

The drawings, which are included in and constitute a part of the description, illustrate exemplary embodiments, features and aspects of the present disclosure together with the description, and serve to explain the principles of the present disclosure.

DETAILED DESCRIPTION

Figure 1:
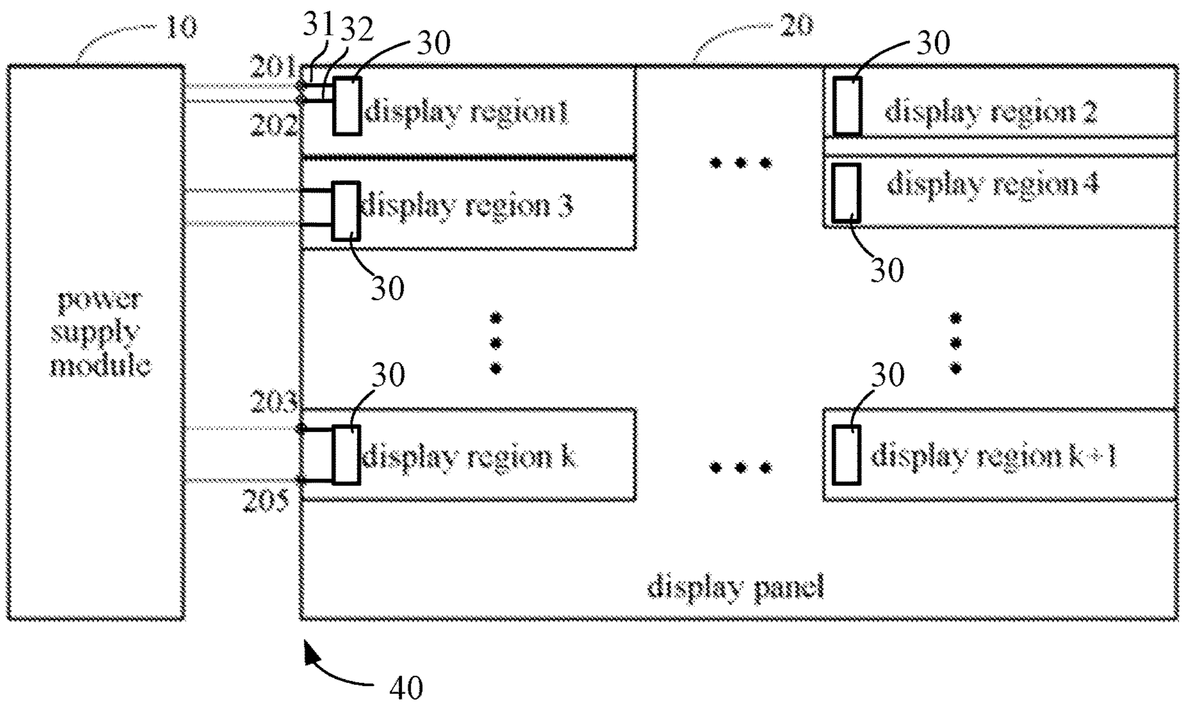
FIG. 1 shows a schematic diagram of a display driving device according to an embodiment of the present disclosure.

Various exemplary embodiments, features and aspects of the present disclosure will be explained in detail below with reference to the drawings. In the drawings, the same reference signs denote elements with the same or similar functions. Although various aspects of the embodiments are shown in the drawings, unless otherwise specified, the drawings are not necessarily drawn to scale.

The word "exemplary" used here means "serving as an example, embodiment or illustration". Any embodiment described here as "exemplary" is not necessarily to be interpreted as superior to or better than other embodiments.

Furthermore, for a better explanation of the present disclosure, numerous specific details are given in the following detailed description of the embodiments. Those skilled in the art should understand that the present disclosure may also be implemented without certain specific details. In some embodiments, methods, means, elements and circuits that are well known to those skilled in the art are not described in detail in order to highlight the main idea of the present disclosure.

Reference is made to FIG. 1 which shows a schematic diagram of a display driving device according to an embodiment of the present disclosure.

As shown in FIG. 1, the device comprises:

a power supply module 10 configured to output a first power supply voltage 201 and a second power supply voltage 202;

a display panel 20 comprising a power interface 40 electrically connected to the power supply module 10, the power interface 40 being configured to input the first power supply voltage 201 and the second power supply voltage 202, the display panel 20 comprising a plurality of light-emitting transistors 30, each of which has a first terminal 31 for receiving the first power supply voltage 201 and a second terminal 32 for receiving the second power supply voltage 202, the display panel 20 being divided into a plurality of display regions based on distances between the light-emitting transistors 30 and the power interface 40 each display region comprising one or more light-emitting transistors 30;

the power supply module 10 being further configured to output a first regulated voltage 203 and/or a second regulated voltage 205 for a target display region (e.g., one of the display regions 1, 2, 3, . . . k, k+1) from which a distance to the power interface is greater than a preset distance, to regulate a first terminal voltage of the light-emitting transistor 30 in the target display region via the first regulated voltage 203 and/or regulate a second terminal voltage via the second regulated voltage 205.

With the above device, in the embodiments of the present disclosure, a first regulated voltage and/or a second regulated voltage are/is output for a target display region from which a distance to a power interface is greater than a preset distance, to regulate a first terminal voltage of a light-emitting transistor in the target display region via the first regulated voltage and/or to regulate a second terminal voltage via the second regulated voltage, which enables uniform display brightness of the respective regions of a display panel and thus improves the display effect.

The device in the embodiments of the present disclosure can be various electronic devices with a display function, such as a user equipment (UE), a mobile station (MS), and a mobile terminal (MT), and is a device that provides voice and/or data connectivity to users, such as a handheld device with a wireless connection function and a vehicle-mounted device. At present, some examples of terminals are as follows: mobile phones, tablet computers, laptop computers, palm computers, mobile internet devices (MIDs), wearable devices, virtual reality (VR) devices, augmented reality (AR) devices, wireless terminals in industrial control, wireless terminals in autonomous driving, wireless terminals in remote medical surgeries, wireless terminals in smart grid, wireless terminals in transportation safety, wireless terminals in smart city, wireless terminals in smart home, wireless terminals in car networking and so on.

In a possible implementation, the display panel comprises any one or more of an LED, a MiniLED, a Micro LED, and an OLED.

In an example, the display transistor in each display region of the display panel usually receives the first power supply voltage and the second power supply voltage via the power interface to acquire driving capability. With an increase in the distance from the power interface, the driving capability of a display region of the display panel far away from the power interface will become lower and lower, that is, there will be a voltage difference between a region close to the power interface and a region far away from the power interface, which will cause the display brightness of a display region far away from the power interface to be lower than that of a display region close to the power interface.

As the size of the display panel gets larger and larger, the wiring on the printed circuit board assembly (PCBA) in the display panel will cause an increase in resistance at the distal end (the display region far away from the power interface), so the voltage at the distal end will be notably lower than that at the proximal end (the display region close to the power interface). For example, assuming that the power interface of the display panel is in the upper left corner shown in FIG. 1, i.e., the position where the first power supply voltage 201 and the second power supply voltage 202 are received, a display region 1 can be considered as the proximal end, and a display region 4, a display region k, a display region k+1, etc. belong to the distal end. Take the display region k which is at the distal end as an example. When the first power supply voltage 201 and the second power supply voltage 202 are transmitted from the power interface to the display region k, there will be a low voltage phenomenon due to the resistance of the wiring on the PCBA. Therefore, the power supply voltage received by each transistor in the display region k will be lower than the power supply voltage received by the display region 1, which will lead to non-uniform display brightness of the display region k and the display region 1, producing a poor display effect and affecting the viewing experience.

In view of the foregoing, according to an embodiment of the present disclosure, the display panel is divided into a plurality of regions, and based on distances between the respective regions and the power interface, a first regulated voltage and/or a second regulated voltage are/is output for a target display region from which a distance to the power interface is greater than a preset distance, to regulate a first terminal voltage of the light-emitting transistor in the target display region via the first regulated voltage and/or regulate a second terminal voltage via the second regulated voltage, such that the display brightness of the regions of the display panel can be uniform and the display effect can be improved.

In a possible implementation, when the display panel is divided into regions, each region may include the same number of display transistors. In other embodiments, the number of display transistors in each region may be different.

In an example, each display region may include a plurality of display transistors, and by collectively regulating the driving voltages of the plurality of display transistors in a target display region from which a distance to the power interface is greater than a preset distance, the regulation efficiency is improved.

In an example, each display region may include one display transistor, and by separately regulating the driving voltage of the display transistor in a target display region from which a distance to the power interface is greater than a preset distance, the regulation accuracy is improved.

In a possible implementation, the first power supply voltage is a positive voltage, and the second power supply voltage is a negative voltage.

In an example, the power supply module may regulate a first terminal voltage or a second terminal voltage of a target display region, or simultaneously regulate a first terminal voltage and a second terminal voltage of a target display region, so as to regulate the driving voltage of the display transistor in the target display region.

Figure 2:
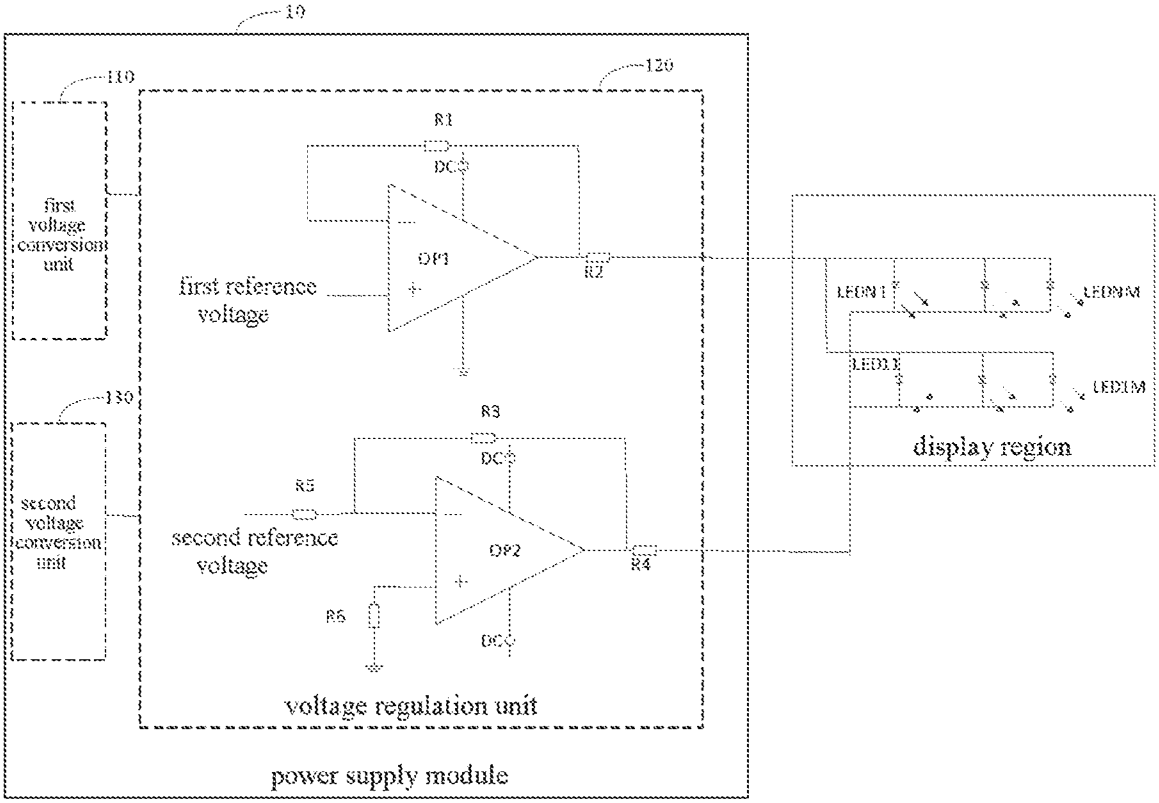
FIG. 2 shows a schematic diagram of a display driving device according to an embodiment of the present disclosure.

Reference is made to FIG. 2 which shows a schematic diagram of a display driving device according to an embodiment of the present disclosure.

In a possible implementation, as shown in FIG. 2, the power supply module 10 may comprise:

- a first voltage conversion unit 110 configured to acquire the first power supply voltage and the second power supply voltage based on an input voltage.

In an example, the first voltage conversion unit 110 may comprise an AC-DC converter and a DC-DC converter, which can convert an input alternating current into a desired direct current or convert an input direct current into a desired direct current.

In a possible implementation, as shown in FIG. 2, the power supply module 10 may further comprise:

- a voltage regulation unit 120 configured to output the first regulated voltage based on a first reference voltage, and/or output the second regulated voltage based on a second reference voltage.

In an example, the first reference voltage and the second reference voltage may be set in advance. For example, a corresponding reference voltage may be set based on a magnitude of the regulated voltage required by each region of the display panel. There certainly can be multiple kinds of sources of the reference voltage.

In a possible implementation, the first voltage conversion unit 110 may be further configured to output the first reference voltage and/or the second reference voltage.

In an example, the first voltage conversion unit 110 may generate the first reference voltage and/or the second reference voltage based on voltage parameters set in advance, and input the first reference voltage and/or the second reference voltage into the voltage regulation unit 120.

In a possible implementation, as shown in FIG. 2, the power supply module may further comprise:

- a second voltage conversion unit 130 configured to acquire the first reference voltage and/or the second reference voltage based on an input voltage.

In an example, the second voltage conversion unit 130 may comprise an AC-DC converter and a DC-DC converter, which can convert an input alternating current into a desired direct current or convert an input direct current into a desired direct current.

In an example, the second voltage conversion unit 130 may generate the first reference voltage and/or the second reference voltage based on voltage parameters set in advance, and input the first reference voltage and/or the second reference voltage into the voltage regulation unit 120.

In an example, the number of the voltage regulation units 120 may correspond to the number of the display regions to be regulated, or may be set to be greater than or equal to the total number of the display regions in the display panel, which is not limited by the embodiments of the present disclosure.

In an example, the respective voltage regulation units 120 may be distributed on the PCBA of the display panel, and may be arranged in specific positions of the PCBA as required. For example, if the power interface is at the upper left end of the PCBA, a plurality of voltage regulation units may be arranged in sequence from left to right or from top to bottom. The specific positions where the voltage regulation units 120 are arranged on the display panel are not limited by the embodiments of the present disclosure.

In a possible implementation, as shown in FIG. 2, the voltage regulation unit 120 may comprise a first operational amplifier OP1, a first resistor R1, and a second resistor R2, wherein:

a positive input terminal of the first operational amplifier OP1 is configured to input the first reference voltage, a negative input terminal of the first operational amplifier OP1 is electrically connected to a second end of the first resistor R1, and an output terminal of the first operational amplifier OP1 is electrically connected to the second end of the first resistor R1 and a first end of the second resistor R2; and a second end of the second resistor R2 is configured to output the first regulated voltage.

In an example, magnitudes of the first resistor R1 and the second resistor R2 as well as parameters of the first operational amplifier can be determined based on a magnitude of the regulated voltage required by each target display region, such that the first regulated voltage is generated by using the first reference voltage to regulate the first power supply voltage of the corresponding target display region.

In a possible implementation, as shown in FIG. 2, the voltage regulation unit 120 may further comprise a second operational amplifier OP2, a third resistor R3, a fourth resistor R4, a fifth resistor R5, and a sixth resistor R6, wherein:

a first end of the fifth resistor R5 is configured to input the second reference voltage, and a second end of the fifth resistor R5 is electrically connected to a negative input terminal of the second operational amplifier OP2 and a first end of the third resistor R3;

a second end of the third resistor R3 is electrically connected to an output terminal of the second operational amplifier OP2 and a first end of the fourth resistor R4;

a positive input terminal of the second operational amplifier OP2 is electrically connected to a first end of the sixth resistor R6, and a second end of the sixth resistor R6 is grounded; and a second end of the fourth resistor R4 is configured to output the second regulated voltage.

In an example, magnitudes of the third resistor R3, the fourth resistor R4, the fifth resistor R5, and the sixth resistor R6 as well as parameters of the second operational amplifier can be determined based on a magnitude of the regulated voltage required by each target display region, such that the second regulated voltage is generated by using the second reference voltage to regulate the second power supply voltage of the corresponding target display region.

In an example, as shown in FIG. 2, after the voltage regulation unit 120 acquires the first regulated voltage and/or the second regulated voltage, it may regulate the power supply voltage of the corresponding display region in the display panel. For example, the display region may include display transistors LEDN1 to LEDNM and display transistors LED11 to LED1M, where N and M are integers greater than or equal to 1. The first regulated voltage may be input to a positive electrode of each display transistor in the display region, and the second regulated voltage may be input to a negative electrode of each display transistor in the display region, such that a positive electrode driving voltage (first power supply voltage) and a negative electrode driving voltage (second power supply voltage) of each display transistor are regulated.

The foregoing describes the implementations of the power supply voltages of the target display region of the display panel. However, the present disclosure is not limited to the above implementations, and other possible implementations are described below.

Figure 3:
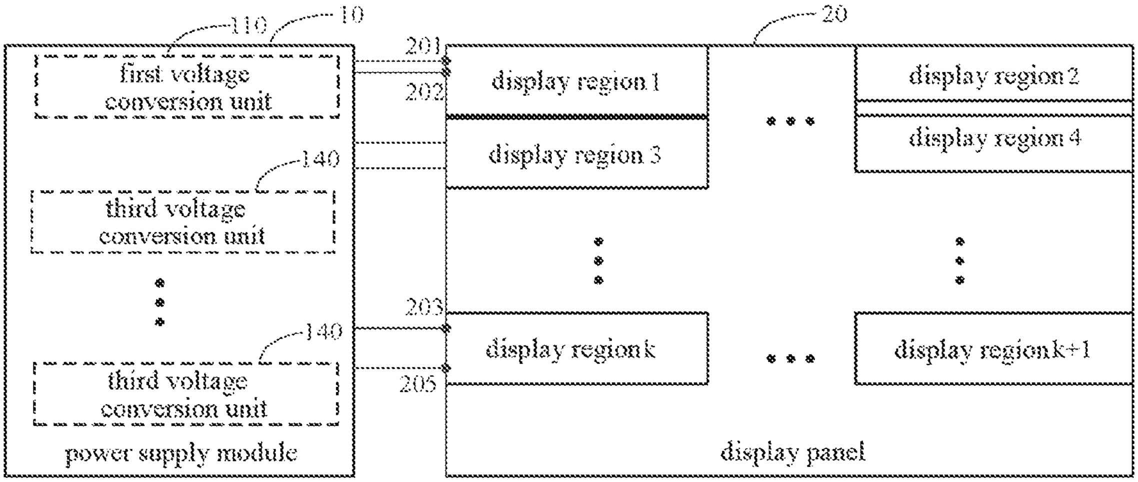
FIG. 3 shows a schematic diagram of a display driving device according to an embodiment of the present disclosure.

Reference is made to FIG. 3 which shows a schematic diagram of a display driving device according to an embodiment of the present disclosure.

In a possible implementation, as shown in FIG. 3, the power supply module 10 may further comprise:

at least one third voltage conversion unit 140, the number of which corresponds to the number of the target display regions, each third voltage conversion unit 140 corresponding to each target region, each third voltage conversion unit 140 being configured to acquire a first terminal voltage of a corresponding target display region, and generate the first regulated voltage by using the first terminal voltage; and/or each third voltage conversion unit 140 being further configured to acquire a second terminal voltage of a corresponding target display region, and generate the second regulated voltage by using the second terminal voltage.

In an example, the third voltage conversion unit 140 may comprise an AC-DC converter and a DC-DC converter, which can convert an input alternating current into a desired direct current or convert an input direct current into a desired direct current.

Each third voltage conversion unit in the embodiment of the present disclosure determines the corresponding regulated voltage by acquiring feedback voltage information (the first terminal voltage and the second terminal voltage) of the corresponding target display region, which can achieve accurate regulation of the driving voltage of each target display region. In addition, the regulation made by the independent third voltage conversion unit to the corresponding target display region has high pertinence, and is more accurate, fast, and efficient.

Figure 4:
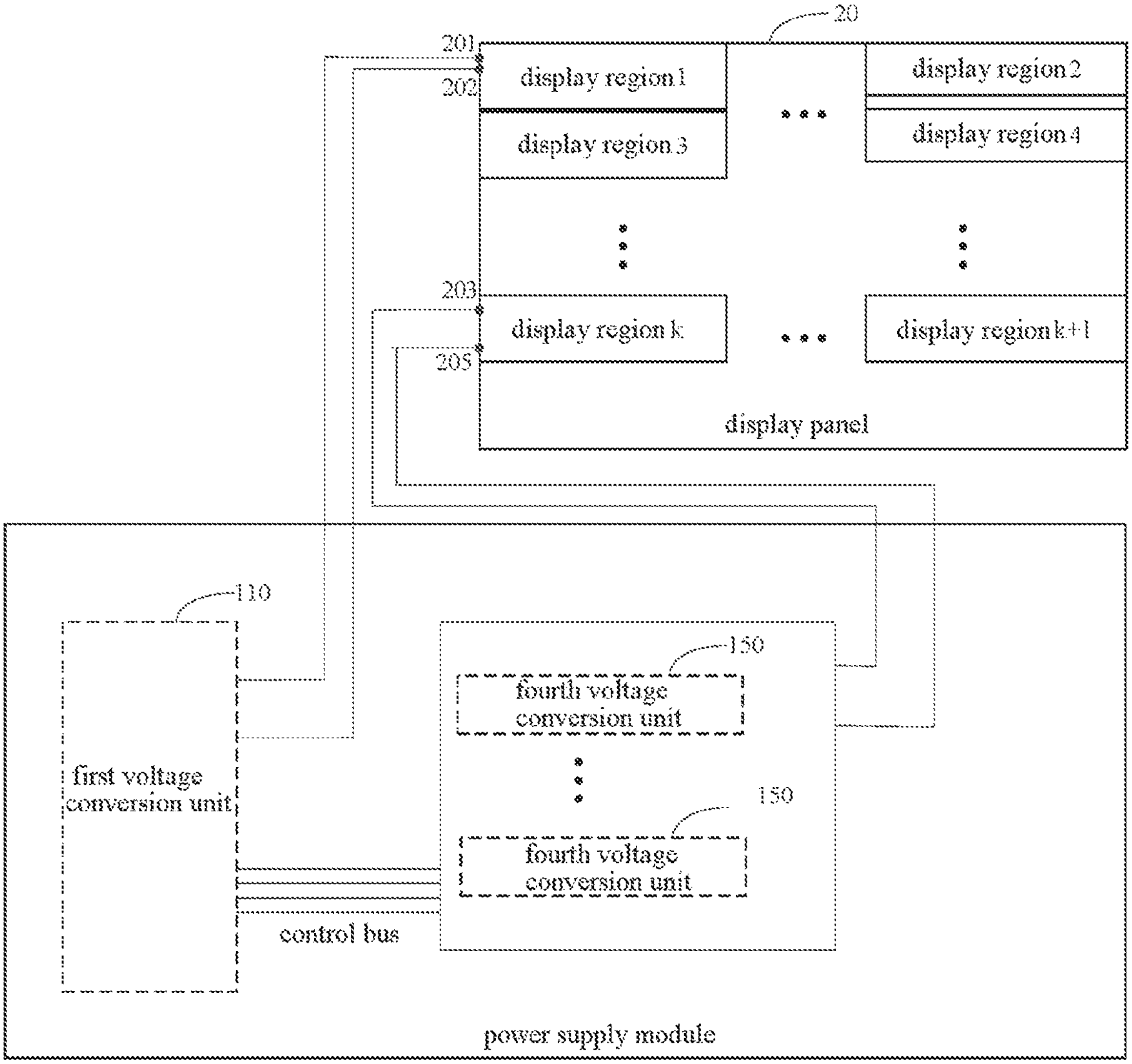
FIG. 4 shows a schematic diagram of a display driving device according to an embodiment of the present disclosure.

Reference is made to FIG. 4 which shows a schematic diagram of a display driving device according to an embodiment of the present disclosure.

In a possible implementation, as shown in FIG. 4, the power supply module 10 may further comprise:

at least one fourth voltage conversion unit 150, the number of which corresponds to the number of the target display regions;

the first voltage conversion unit 110 being further configured to control each fourth voltage conversion unit to output the first regulated voltage and/or the second regulated voltage, wherein the first voltage conversion unit 110 and at least one fourth voltage conversion unit 150 are configured to operate in a master-slave working mode, and the first voltage conversion unit and the at least one fourth voltage conversion unit are electrically connected through a control bus.

In an example, the fourth voltage conversion unit 150 may comprise an AC-DC converter and a DC-DC converter, which can convert an input alternating current into a desired direct current or convert an input direct current into a desired direct current.

In an example, the first voltage conversion unit 110 may serve as a master to control a plurality of fourth voltage conversion units 150 which serve as slaves.

In an example, the first voltage conversion unit 110 may also realize the capability of synchronously controlling the magnitude of the output current. For example, if it is required that the current and the voltage of each of the fourth voltage conversion units 150 are controlled to be consistent in the whole application process, the first voltage conversion unit 110 can perform such control on the fourth voltage conversion units 150 in a unified manner. Theoretically, each region of the display panel should have consistent voltage and current, so specific values may be set by internal registers, or special values may be set based on the characteristics of the panel, and transmitted to the fourth voltage conversion unit 150 through communication protocols such as I2C or ISP.

In a possible implementation, the first voltage conversion unit is further configured to acquire a first terminal voltage of each target display region, and control a corresponding fourth voltage conversion unit to output the first regulated voltage by using the first terminal voltage; and/or the first voltage conversion unit is further configured to acquire a second terminal voltage of each target display region, and control a corresponding fourth voltage conversion unit to output the second regulated voltage by using the second terminal voltage.

The first voltage conversion unit not only can control each fourth voltage conversion unit to output the regulated voltage or regulated current through preset voltage parameters or current parameters, but also can acquire the first terminal voltage, the second terminal voltage, or information of the current in the target display region through feedback, to control each fourth voltage conversion unit to output the regulated voltage or regulated current based on the acquired feedback information.

By the above means, the embodiments of the present disclosure can quickly and accurately regulate the power supply voltage of each display region by configuring the first voltage conversion unit and the fourth voltage conversion unit to be in a master-slave working mode. Each implementation of the present disclosure can obviously improve the uniformity of brightness of the panel, and this effect will be more obvious especially with the increase of panel size.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A display driving device, comprising:

a power supply module configured to output a first power supply voltage and a second power supply voltage; and a display panel comprising a power interface electrically connected to the power supply module, the power interface being configured to input the first power supply voltage and the second power supply voltage, the display panel further comprising light-emitting transistors, a first terminal of each of the light-emitting transistors being used for receiving the first power supply voltage and a second terminal of each of the light-emitting transistors being used for receiving the second power supply voltage, the display panel being divided into a plurality of display regions based on distances between each of the light-emitting transistors and the power interface, each display region comprising a subset of the light-emitting transistors;

wherein the power supply module is further configured to output a first regulated voltage and/or a second regulated voltage for a target display region from which a distance to the power interface is greater than a preset distance, to regulate a first terminal voltage of the light-emitting transistor of a respective subset in the target display region by the first regulated voltage and/or regulate a second terminal voltage of the light-emitting transistors of the respective subset by the second regulated voltage.

2. The display driving device according to claim 1, wherein the power supply module comprises:

a first voltage conversion unit configured to acquire the first power supply voltage and the second power supply voltage based on an input voltage.

3. The display driving device according to claim 2, wherein the power supply module further comprises:

a voltage regulation unit configured to output the first regulated voltage based on a first reference voltage, and/or output the second regulated voltage based on a second reference voltage.

4. The display driving device according to claim 3, wherein the voltage regulation unit comprises a first operational amplifier, a first resistor, and a second resistor, wherein a positive input terminal of the first operational amplifier is configured to input the first reference voltage, a negative input terminal of the first operational amplifier is electrically connected to a second end of the first resistor, and an output terminal of the first operational amplifier is electrically connected to the second end of the first resistor and a first end of the second resistor; and a second end of the second resistor is configured to output the first regulated voltage.

5. The display driving device according to claim 3, wherein the voltage regulation unit further comprises a second operational amplifier, a third resistor, a fourth resistor, a fifth resistor, and a sixth resistor, wherein a first end of the fifth resistor is configured to input the second reference voltage, and a second end of the fifth resistor is electrically connected to a negative input terminal of the second operational amplifier and a first end of the third resistor;

a second end of the third resistor is electrically connected to an output terminal of the second operational amplifier and a first end of the fourth resistor;

a positive input terminal of the second operational amplifier is electrically connected to a first end of the sixth resistor, and a second end of the sixth resistor is grounded; and a second end of the fourth resistor is configured to output the second regulated voltage.

6. The display driving device according to claim 3, wherein the first voltage conversion unit is further configured to output the first reference voltage and/or the second reference voltage.

7. The display driving device according to claim 3, wherein the power supply module further comprises:

a second voltage conversion unit configured to acquire the first reference voltage and/or the second reference voltage based on an input voltage.

8. The display driving device according to claim 1, wherein the power supply module comprises:

at least one third voltage conversion unit, a number of which corresponds to a number of the target display regions, each third voltage conversion unit corresponding to each target display region, each third voltage conversion unit being configured to acquire a first terminal voltage of a corresponding target display region and generate the first regulated voltage via the first terminal voltage; and/or each third voltage conversion unit being configured to acquire a second terminal voltage of a corresponding target display region and generate the second regulated voltage via the second terminal voltage.

9. The display driving device according to claim 2, wherein the power supply module further comprises:

at least one fourth voltage conversion unit, a number of which corresponds to a number of the target display regions;

the first voltage conversion unit being further configured to control each fourth voltage conversion unit to output the first regulated voltage and/or the second regulated voltage, wherein the first voltage conversion unit and at least one fourth voltage conversion unit are configured to operate in a master-slave working mode, and the first voltage conversion unit and the at least one fourth voltage conversion unit are electrically connected through a control bus.

10. The display driving device according to claim 9, wherein the first voltage conversion unit is further configured to acquire a first terminal voltage of each target display region, and control a corresponding fourth voltage conversion unit via the first terminal voltage to output the first regulated voltage; and/or the first voltage conversion unit is further configured to acquire a second terminal voltage of each target display region, and control a corresponding fourth voltage conversion unit via the second terminal voltage to output the second regulated voltage.

11. The display driving device according to claim 1, wherein the first power supply voltage is a positive voltage, and the second power supply voltage is a negative voltage.

12. The display driving device according to claim 1, wherein the display panel comprises one or more of an LED, a Mini light-emitting diode (MiniLED), a MicroLED, or an organic light-emitting diode (OLED).

13. An electronic apparatus, comprising a display driving device, wherein the display driving device comprises:

a power supply module configured to output a first power supply voltage and a second power supply voltage; and a display panel comprising a power interface electrically connected to the power supply module, the power interface being configured to input the first power supply voltage and the second power supply voltage, the display panel further comprising light-emitting transistors, a first terminal of each of the light-emitting transistors being used for receiving the first power supply voltage and a second terminal of each of the light-emitting transistors being used for receiving the second power supply voltage, the display panel being divided into a plurality of display regions based on distances between each of the light-emitting transistors and the power interface, each display region comprising a subset of the light-emitting transistors;

wherein the power supply module is further configured to output a first regulated voltage and/or a second regulated voltage for a target display region from which a distance to the power interface is greater than a preset distance, to regulate a first terminal voltage of the light-emitting transistor of a respective subset in the target display region by the first regulated voltage and/or regulate a second terminal voltage of the light-emitting transistors of the respective subset by the second regulated voltage.

14. The electronic apparatus according to claim 13, comprising a display, a smart phone, or a portable device.

* * * * *